United States Patent [19]

Montag et al.

[11] 4,346,166

[45] Aug. 24, 1982

[54] METHOD OF MAKING FAMILIES OF STEADY-STATE HEAT TRANSFER COEFFICIENT CURVES VISIBLE BY PHOTOCHEMICAL MEANS

[75] Inventors: Bernhard Montag, Forchheim; Heinrich Optiz, Erlangen, both of Fed. Rep. of Germany

[73] Assignee: Siemens Aktiengesellschaft, Berlin and Munich, Fed. Rep. of Germany

[21] Appl. No.: 236,235

[22] Filed: Feb. 20, 1981

[30] Foreign Application Priority Data

Mar. 4, 1980 [DE] Fed. Rep. of Germany ....... 3008265

[51] Int. Cl.$^3$ ................................................ G03C 5/30
[52] U.S. Cl. .................................... 430/435; 430/445; 73/147
[58] Field of Search ................... 430/435, 445; 73/147, 73/168, 432 R

[56] References Cited

U.S. PATENT DOCUMENTS

| | | | |
|---|---|---|---|
| 3,301,046 | 1/1967 | Rubert et al. | 264/226 |
| 3,774,225 | 11/1973 | Kimmel et al. | 430/434 |
| 3,890,835 | 6/1975 | Dötzer et al. | 430/434 |
| 4,250,249 | 2/1981 | Montag | 430/355 |
| 4,259,431 | 3/1981 | Opitz et al. | 430/199 |

*Primary Examiner*—Mary F. Downey
*Attorney, Agent, or Firm*—Kenyon & Kenyon

[57] ABSTRACT

For making families of steady-state heat transfer coefficient curves visible, the invisible residual moisture profile obtained by exposing a moisture photogelatin layer to a gas is immersed, in daylight, in a soluble organic sulfur compound, particularly thioacetamide, and is converted into a silver sulfide line photogram. The method is used, for example, for making visible families of steady-state heat transfer coefficient curves on forced air-cooled electronic assemblies.

3 Claims, 2 Drawing Figures

METHOD OF MAKING FAMILIES OF STEADY-STATE HEAT TRANSFER COEFFICIENT CURVES VISIBLE BY PHOTOCHEMICAL MEANS

BACKGROUND OF THE INVENTION

The invention relates to a method for making families of steady-state heat transfer coefficient curves visible by photochemical means, by applying a moist photogelatin layer to a surface subjected to a gas stream.

One proposed method for displaying families of heat transfer coefficient curves is the so-called "isohumid method" described in our commonly-assigned, co-pending patent application, Ser. No. 132,769, filed Mar. 24, 1980 now U.S. Pat. No. 4,259,431. This method uses a purely photographic development for making the isohumids visible. Families of steady-state heat transfer coefficient curves are made visible by pressing exposed wet films on unexposed films in a dark room, seeding the wet copy with hydrogen sulfide gas and developing it into a transparent silver image with commercially available photographic developers. This method requires a dark room and hydrogen sulfide is used for generating developable image seeds in the photographic layer of the wet film. Disadvantages of hydrogen sulfide are particularly its high toxicity and objectionable odor. An exhaust system is necessary when this compound is used.

SUMMARY OF THE INVENTION

It is an object of the present invention to pictorially display families of steady-state heat transfer coefficient curves by a wet-film technique on photographic films, avoiding the mentioned shortcomings of the earlier-described method.

According to the present invention, this and other objects are achieved by the provision of a process wherein an invisible residual moisture profile which has been exposed in a gas stream, and particularly in an air stream, is dipped, in daylight, into a developer solution mixture containing an organic sulfur compound soluble in alcohol, and is converted into a silver sulfide line photogram. The sulfur compound concentration is preferably from about 0.5 to 2 grams referred to 100 ml of solvent mixture.

According to the process of this invention, an isohumid family first is prepared using the known sequence technique by graduated exposure times of the individual wet films. According to the invention, the transparent silver sulfide line photograms are developed simply by immersion in an alcoholic solution, containing an organic sulfur compound, of propane diol containing ethanol or propanol amine, followed by the post-treatment steps customary in photographic techniques such as fixing, rinsing and drying. As opposed to hydrogen sulfide, the sulfur compounds employed are not detrimental to health. The development of each individual isohumid into a visible transparent photogram proceeds with extreme contrast. A typical line photogram is produced such as shown in FIG. 1.

For carrying out the method according to this invention, propane diol baths with an ethanol or propanol amine content of about 2.5 to 5 volume percent serve particularly well.

Suitable soluble organic sulfur compounds are, for example, thiobenzamide, thiosemicarbazide, phenyl thiourea and N-alkyl thiourea. Particularly good results can be obtained with thioacetamide.

The black-and-white photograms obtained by carrying out the method according to the invention can subsequently be converted by a color copying method, for example, Agfa "Transparex", 3 M-Colorkey, Reguprint and others, into colored contours, numerous colors being available. If superimposed in registration, the color foil copies furnish a multi-colored transparent "isohumid sandwich".

An isohumid sandwich, in which several transparent colored isohumid contours are stacked on top of each other, represents the geometric pattern of the heat transfer zones as well as their sequence.

With the family of isohumids obtained by the method according to this invention, it is possible to determine other physical data by correlation of a heat transfer coefficient by means of a suitable calibration.

The method of this invention can be applied for recording steady-state flow conditions in a blower rotors, blower stators and housings.

DETAILED DESCRIPTION OF THE INVENTION

The present invention is explained in further detail with the aid of the following illustrative examples.

EXAMPLE 1

For recording a family of heat transfer coefficient curves on the underside of a forced air-cooled electronic assembly, an isohumid family is prepared as follows. Several photographic films swelled in water are successively exposed in daylight with increasing exposure times to the air stream on the surface to be cooled. For converting the still invisible residual moisture profile on the exposed wet films into visible line isohumids, the following operations are performed:

(a) Development in the developer bath at room temperature and in daylight. This bath has the following composition: either 2.5 volume percent ethanol amine or 2.5 percent propanol amine are mixed with propane diol. In this solution, 0.5 to 1 gram thioacetamide are dissolved per 100 ml solvent mixture.

After an immersion time of about 2 to 5 minutes, a line picture is developed;

(b) This image is rinsed in alcohol at room temperature for about 1 minute while being moved, to remove developer residue;

(c) The line image (isohumids) then is clarified in a commercial fixing bath for about 5 minutes;

(d) The film is rinsed in water; and (e) The film then is dried in air.

EXAMPLE 2

Figure 1:
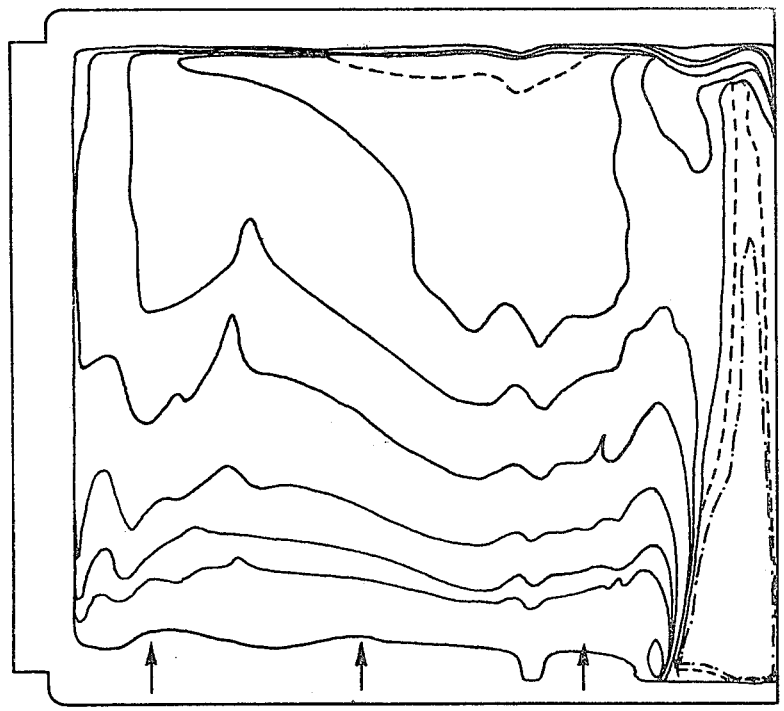
Figure 2:
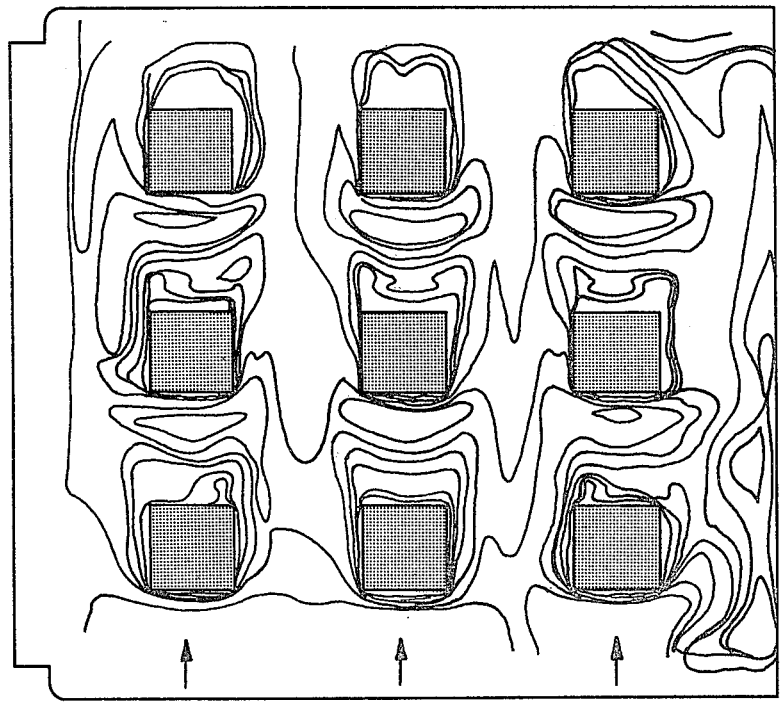

For recording a family of heat transfer coefficient curves on a forced air-cooled electronic circuit board, a family of isohumids according to FIG. 2 is prepared as follows:

Several photographic films swelled in water are successively exposed in daylight with increasing exposure times to the air stream on the surface to be cooled. For converting the still invisible residual moisture profile on the exposed wet films into visible line isohumids, the following operations are performed:

(a) Development in the developer bath at room temperature and in daylight. This bath has the following composition: either 2.5 volume percent ethanol amine or 2.5 volume percent propanol amine are mixed with propane diol. In this solution, 0.5 to 1 gram N-alkyl thiourea per 100 ml solvent mixture are dissolved.

A line image is developed after an immersion time of 2 to 5 minutes;

(b) This image is rinsed in alcohol at room temperature for about 1 minute while being moved, for removing developer residue.

(c) The line image (isohumids) then is clarified in a commercial fixing bath;

(d) The film is rinsed in water; and (e) The film then is dried in air.

What is claimed is:

1. In a method for making families of steady-state heat transfer coefficient curves visible by photochemical means, wherein, a moist silver halide-containing photogelatin layer is applied to a surface and subjected to a gas stream, whereby an invisible residual moisture profile is obtained in said photogelatin layer, the improvement comprising converting said residual moisture profile into a silver sulfide line photogram by immersing said photogelatin layer, in daylight, in a developer solution mixture comprising alcohol and an organic sulfur compound soluble in alcohol and capable of reacting with the silver halide to form a silver sulfide, and thereafter fixing the line photogram.

2. The method according to claim 1, wherein said developer solution mixture comprises from about 0.5 to 2 grams of said sulfur compound, referred to 100 ml of solvent mixture.

3. The method according to claims 1 or 2 wherein said sulfur compound is thioacetamide.

* * * * *